United States Patent
Devlin et al.

(10) Patent No.: US 12,548,980 B2
(45) Date of Patent: Feb. 10, 2026

(54) SINGLE ELEMENT DOT PATTERN PROJECTOR

(71) Applicant: Metalenz, Inc., Boston, MA (US)

(72) Inventors: Robert C. Devlin, Stoneham, MA (US); Pawel Latawiec, Chicago, IL (US); John Graff, Swampscott, MA (US)

(73) Assignee: Metalenz, Inc., Boston, MA (US)

( * ) Notice: Subject to any disclaimer, the term of this patent is extended or adjusted under 35 U.S.C. 154(b) by 833 days.

(21) Appl. No.: 17/804,030

(22) Filed: May 25, 2022

(65) Prior Publication Data

US 2022/0385042 A1    Dec. 1, 2022

Related U.S. Application Data

(60) Provisional application No. 63/192,962, filed on May 25, 2021.

(51) Int. Cl.
| | |
|---|---|
| *H01S 5/42* | (2006.01) |
| *H01S 5/183* | (2006.01) |
| *G01S 7/481* | (2006.01) |
| *G01S 17/894* | (2020.01) |
| *G02B 27/30* | (2006.01) |

(52) U.S. Cl.
CPC ...... *H01S 5/18391* (2013.01); *H01S 5/18388* (2013.01); *H01S 5/423* (2013.01); *G01S 7/4815* (2013.01); *G01S 17/894* (2020.01); *G02B 27/30* (2013.01)

(58) Field of Classification Search
CPC .. H01S 5/423; H01S 5/18388; H01S 5/18394; H01S 5/18391
See application file for complete search history.

(56) References Cited

U.S. PATENT DOCUMENTS

| | | | |
|---|---|---|---|
| 6,097,856 A | 8/2000 | Hammond, Jr. | |
| 6,731,839 B2 | 5/2004 | Bhagavatula et al. | |

(Continued)

FOREIGN PATENT DOCUMENTS

| | | |
|---|---|---|
| CN | 100476504 C | 4/2009 |
| CN | 101510013 B | 6/2010 |

(Continued)

OTHER PUBLICATIONS

International Preliminary Report on Patentability for International Application PCT/US2022/072562, Report issued Nov. 21, 2023, Mailed on Dec. 7, 2023, 07 Pgs.

(Continued)

*Primary Examiner* — Ryan D Howard
(74) *Attorney, Agent, or Firm* — KPPB LLP

(57) ABSTRACT

Disclosed herein are single element dot pattern projectors with a meta-optics. The projectors include a laser light source and a metasurface chip integrated onto the laser light source. The metasurface chip includes metasurface elements spaced apart from the laser light source by a distance equal to the collimating function focal length of the metasurface chip. the laser light source produces light which is diffracted through the metasurface elements to produce a dot pattern. Projectors enabled by meta-optics lead to unique methods of integrating the meta-optic and unique functionality that can be added to the dot pattern.

19 Claims, 16 Drawing Sheets

(56) References Cited

U.S. PATENT DOCUMENTS

| | | |
|---|---|---|
| 6,825,986 B2 | 11/2004 | Ashkinazy et al. |
| 6,924,457 B2 | 8/2005 | Koyama et al. |
| 6,927,922 B2 | 8/2005 | George et al. |
| 7,061,693 B2 | 6/2006 | Zalevsky |
| 7,171,078 B2 | 1/2007 | Sasaki et al. |
| 7,171,084 B2 | 1/2007 | Izumi et al. |
| 7,186,969 B2 | 3/2007 | Altendorf et al. |
| 7,241,988 B2 | 7/2007 | Gruber et al. |
| 7,324,210 B2 | 1/2008 | De et al. |
| 7,327,468 B2 | 2/2008 | Maznev et al. |
| 7,402,131 B2 | 7/2008 | Mueth et al. |
| 7,450,618 B2 | 11/2008 | Dantus et al. |
| 7,547,874 B2 | 6/2009 | Liang |
| 7,561,264 B2 | 7/2009 | Treado et al. |
| 7,576,899 B2 | 8/2009 | Kanesaka et al. |
| 7,679,830 B2 | 3/2010 | Dowski, Jr. |
| 7,684,097 B2 | 3/2010 | Fukumoto et al. |
| 7,773,307 B2 | 8/2010 | Shih |
| 7,800,683 B2 | 9/2010 | Zalevsky et al. |
| 7,812,295 B2 | 10/2010 | Zalevsky et al. |
| 7,929,220 B2 | 4/2011 | Sayag |
| 7,965,607 B2 | 6/2011 | Fukumoto et al. |
| 8,009,358 B2 | 8/2011 | Zalevsky et al. |
| 8,040,604 B2 | 10/2011 | Zalevsky et al. |
| 8,107,705 B2 | 1/2012 | Dowski, Jr. et al. |
| 8,152,307 B2 | 4/2012 | Duelli et al. |
| 8,169,703 B1 | 5/2012 | Mossberg et al. |
| 8,192,022 B2 | 6/2012 | Zalevsky |
| 8,212,866 B2 | 7/2012 | Lemmer et al. |
| 8,318,386 B2 | 11/2012 | Kobrin |
| 8,351,048 B2 | 1/2013 | Millerd |
| 8,351,120 B2 | 1/2013 | Deng et al. |
| 8,390,932 B2 | 3/2013 | Jia et al. |
| 8,430,513 B2 | 4/2013 | Chang et al. |
| 8,451,368 B2 | 5/2013 | Sung et al. |
| 8,472,797 B2 | 6/2013 | Ok et al. |
| 8,558,873 B2 | 10/2013 | Mceldowney |
| 8,649,631 B2 | 2/2014 | Islam et al. |
| 8,687,040 B2 | 4/2014 | Silveira |
| 8,734,033 B2 | 5/2014 | Walters et al. |
| 8,816,460 B2 | 8/2014 | Kalevo et al. |
| 8,876,289 B2 | 11/2014 | Diaz et al. |
| 8,908,149 B2 | 12/2014 | Freimann |
| 9,007,451 B2 | 4/2015 | Rogers et al. |
| 9,212,899 B2 | 12/2015 | Johnson et al. |
| 9,309,274 B2 | 4/2016 | Van Der Boom et al. |
| 9,310,535 B1 | 4/2016 | Greiner et al. |
| 9,329,484 B1 | 5/2016 | Markle et al. |
| 9,330,704 B2 | 5/2016 | Nishimura et al. |
| 9,367,036 B2 | 6/2016 | Pyun et al. |
| 9,369,621 B2 | 6/2016 | Malone et al. |
| 9,392,153 B2 | 7/2016 | Myhre et al. |
| 9,606,415 B2 | 3/2017 | Zheludev et al. |
| 9,609,190 B2 | 3/2017 | Lee et al. |
| 9,766,463 B2 | 9/2017 | Border et al. |
| 9,778,404 B2 | 10/2017 | Divliansky et al. |
| 9,825,074 B2 | 11/2017 | Tian et al. |
| 9,829,700 B2 | 11/2017 | Parent et al. |
| 9,835,870 B2 | 12/2017 | Astratov et al. |
| 9,836,122 B2 | 12/2017 | Border |
| 9,869,580 B2 | 1/2018 | Grossinger et al. |
| 9,880,377 B1 | 1/2018 | Safrani et al. |
| 9,885,859 B2 | 2/2018 | Harris |
| 9,891,393 B2 | 2/2018 | Reece |
| 9,947,118 B2 | 4/2018 | Khare et al. |
| 9,958,251 B1 | 5/2018 | Brock et al. |
| 9,967,541 B2 | 5/2018 | Piestun |
| 9,978,801 B2 | 5/2018 | Park et al. |
| 9,989,680 B2 | 6/2018 | Arbabi et al. |
| 9,995,859 B2 | 6/2018 | Kamali et al. |
| 10,007,118 B2 | 6/2018 | Border |
| 10,054,859 B2 | 8/2018 | Ye et al. |
| 10,108,085 B2 | 10/2018 | Peters et al. |
| 10,126,466 B2 | 11/2018 | Lin et al. |
| 10,149,612 B2 | 12/2018 | Muyo et al. |
| 10,254,454 B2 | 4/2019 | Klug et al. |
| 10,267,957 B2 | 4/2019 | Kamali et al. |
| 10,310,148 B2 | 6/2019 | Stewart et al. |
| 10,310,387 B2 | 6/2019 | Palmer et al. |
| 10,317,667 B2 | 6/2019 | Waller et al. |
| 10,324,314 B2 | 6/2019 | Czaplewski et al. |
| 10,338,275 B1 | 7/2019 | Acosta et al. |
| 10,341,640 B2 | 7/2019 | Shechtman et al. |
| 10,345,246 B2 | 7/2019 | Tian et al. |
| 10,345,519 B1 | 7/2019 | Miller et al. |
| 10,365,416 B2 | 7/2019 | Zhan et al. |
| 10,371,936 B2 | 8/2019 | Didomenico |
| 10,386,620 B2 | 8/2019 | Astratov et al. |
| 10,402,993 B2 | 9/2019 | Han et al. |
| 10,416,565 B2 | 9/2019 | Ahmed et al. |
| 10,440,244 B2 | 10/2019 | Rosenblatt et al. |
| 10,440,300 B2 | 10/2019 | Rephaeli et al. |
| 10,466,394 B2 | 11/2019 | Lin et al. |
| 10,468,447 B2 | 11/2019 | Akselrod et al. |
| 10,514,296 B2 | 12/2019 | Han et al. |
| 10,527,832 B2 | 1/2020 | Schwab et al. |
| 10,527,851 B2 | 1/2020 | Lin et al. |
| 10,536,688 B2 | 1/2020 | Haas et al. |
| 10,539,723 B2 | 1/2020 | Iazikov et al. |
| 10,545,323 B2 | 1/2020 | Schwab et al. |
| 10,979,635 B2 * | 4/2021 | Hu ................. H04N 23/698 |
| 11,385,516 B2 | 7/2022 | Didomenico |
| 2002/0048727 A1 | 4/2002 | Zhou et al. |
| 2003/0107787 A1 | 6/2003 | Bablumyan |
| 2005/0239003 A1 | 10/2005 | Chiodini et al. |
| 2006/0042322 A1 | 3/2006 | Mendoza et al. |
| 2012/0140235 A1 | 6/2012 | Lee et al. |
| 2012/0258407 A1 | 10/2012 | Sirat |
| 2015/0055745 A1 | 2/2015 | Holzner et al. |
| 2016/0077261 A1 | 3/2016 | Arbabi et al. |
| 2016/0195705 A1 | 7/2016 | Betzig et al. |
| 2016/0331457 A1 | 11/2016 | Varghese et al. |
| 2016/0341859 A1 | 11/2016 | Shvets et al. |
| 2016/0361002 A1 | 12/2016 | Palikaras et al. |
| 2017/0038574 A1 | 2/2017 | Zhuang et al. |
| 2017/0125911 A1 | 5/2017 | Alu et al. |
| 2017/0131460 A1 | 5/2017 | Lin et al. |
| 2017/0201067 A1 | 7/2017 | Shchukin et al. |
| 2017/0250577 A1 | 8/2017 | Ho et al. |
| 2017/0299784 A1 | 10/2017 | Mikkelsen et al. |
| 2017/0329201 A1 | 11/2017 | Arnold |
| 2018/0035101 A1 | 2/2018 | Osterhout |
| 2018/0044234 A1 | 2/2018 | Hokansson et al. |
| 2018/0107015 A1 | 4/2018 | Dümpelmann et al. |
| 2018/0217395 A1 | 8/2018 | Lin et al. |
| 2018/0231700 A1 | 8/2018 | Ahmed et al. |
| 2018/0236596 A1 | 8/2018 | Ihlemann et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0314130 A1 | 11/2018 | Joo et al. |
| 2019/0025463 A1 | 1/2019 | She et al. |
| 2019/0041642 A1 | 2/2019 | Haddick et al. |
| 2019/0044003 A1 | 2/2019 | Heck et al. |
| 2019/0049632 A1 | 2/2019 | Shin et al. |
| 2019/0049732 A1 | 2/2019 | Lee et al. |
| 2019/0057512 A1 | 2/2019 | Han et al. |
| 2019/0064532 A1 | 2/2019 | Riley, Jr. et al. |
| 2019/0086579 A1 | 3/2019 | Kim et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137793 A1 | 5/2019 | Luo et al. |
| 2019/0139243 A1 | 5/2019 | You et al. |
| 2019/0154877 A1 | 5/2019 | Capasso et al. |
| 2019/0170655 A1 | 6/2019 | Smith |
| 2019/0206136 A1 | 7/2019 | West et al. |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |
| 2019/0369401 A1 | 12/2019 | Rolland et al. |

(56) References Cited

U.S. PATENT DOCUMENTS

| | | | |
|---|---|---|---|
| 2019/0377084 | A1 | 12/2019 | Sleasman et al. |
| 2019/0391378 | A1 | 12/2019 | Eichelkraut et al. |
| 2020/0025888 | A1 | 1/2020 | Jang et al. |
| 2020/0259307 | A1 | 8/2020 | Sharma et al. |
| 2021/0190593 | A1 | 6/2021 | Yao |
| 2021/0208469 | A1 | 7/2021 | Didomenico |
| 2022/0214219 | A1 | 7/2022 | Faraon et al. |

FOREIGN PATENT DOCUMENTS

| | | | |
|---|---|---|---|
| CN | 101510012 | B | 8/2010 |
| CN | 101510011 | B | 9/2010 |
| CN | 101241173 | B | 8/2011 |
| CN | 202854395 | U | 4/2013 |
| CN | 103092049 | A | 5/2013 |
| CN | 203799117 | U | 8/2014 |
| CN | 204719330 | U | 10/2015 |
| CN | 103869484 | B | 1/2016 |
| CN | 103257441 | B | 10/2016 |
| CN | 205620619 | U | 10/2016 |
| CN | 104834079 | B | 4/2017 |
| CN | 104834089 | B | 6/2017 |
| CN | 106200276 | B | 10/2017 |
| CN | 104834088 | B | 12/2017 |
| CN | 105676314 | B | 1/2018 |
| CN | 107561857 | A | 1/2018 |
| CN | 108089325 | A | 5/2018 |
| CN | 207623619 | U | 7/2018 |
| CN | 106199997 | B | 8/2018 |
| CN | 108507542 | A | 9/2018 |
| CN | 207923075 | U | 9/2018 |
| CN | 108680544 | A | 10/2018 |
| CN | 108761779 | A | 11/2018 |
| CN | 109000692 | A | 12/2018 |
| CN | 208270846 | U | 12/2018 |
| CN | 106199956 | B | 2/2019 |
| CN | 109360139 | A | 2/2019 |
| CN | 106950195 | B | 5/2019 |
| CN | 106324832 | B | 7/2019 |
| CN | 106526730 | B | 7/2019 |
| CN | 106485761 | B | 8/2019 |
| CN | 110160685 | A | 8/2019 |
| CN | 110678773 | A | 1/2020 |
| CN | 213092332 | U | 4/2021 |
| CN | 113050295 | A | 6/2021 |
| CN | 110376665 | B | 8/2021 |
| CN | 213902664 | U | 8/2021 |
| CN | 213903843 | U | 8/2021 |
| CN | 214098104 | U | 8/2021 |
| CN | 113703080 | A | 11/2021 |
| CN | 113791524 | A | 12/2021 |
| CN | 113807312 | A | 12/2021 |
| CN | 113820839 | A | 12/2021 |
| CN | 113834568 | A | 12/2021 |
| CN | 113835227 | A | 12/2021 |
| CN | 113851573 | A | 12/2021 |
| CN | 215005942 | U | 12/2021 |
| CN | 215010478 | U | 12/2021 |
| CN | 110494771 | B | 1/2022 |
| CN | 113885106 | A | 1/2022 |
| CN | 113899451 | A | 1/2022 |
| CN | 113900078 | A | 1/2022 |
| CN | 113900162 | A | 1/2022 |
| CN | 113917574 | A | 1/2022 |
| CN | 113917578 | A | 1/2022 |
| CN | 113934004 | A | 1/2022 |
| CN | 113934005 | A | 1/2022 |
| CN | 113959984 | A | 1/2022 |
| CN | 114002707 | A | 2/2022 |
| CN | 114019589 | A | 2/2022 |
| CN | 114047632 | A | 2/2022 |
| CN | 114047637 | A | 2/2022 |
| CN | 114112058 | A | 3/2022 |
| CN | 114156168 | A | 3/2022 |
| CN | 114176492 | A | 3/2022 |
| CN | 215932365 | U | 3/2022 |
| CN | 114280704 | A | 4/2022 |
| CN | 114280716 | A | 4/2022 |
| CN | 114296180 | A | 4/2022 |
| CN | 114325886 | A | 4/2022 |
| CN | 114326163 | A | 4/2022 |
| CN | 114354141 | A | 4/2022 |
| CN | 114373825 | A | 4/2022 |
| CN | 114384612 | A | 4/2022 |
| CN | 114397092 | A | 4/2022 |
| CN | 114397718 | A | 4/2022 |
| CN | 114415386 | A | 4/2022 |
| CN | 216345776 | U | 4/2022 |
| CN | 216351311 | U | 4/2022 |
| CN | 216351591 | U | 4/2022 |
| CN | 216355281 | U | 4/2022 |
| CN | 216361353 | U | 4/2022 |
| CN | 114488365 | A | 5/2022 |
| CN | 114543993 | A | 5/2022 |
| CN | 114545367 | A | 5/2022 |
| CN | 114545370 | A | 5/2022 |
| CN | 114554062 | A | 5/2022 |
| CN | 114561266 | A | 5/2022 |
| CN | 216593224 | U | 5/2022 |
| CN | 216605227 | U | 5/2022 |
| CN | 216622749 | U | 5/2022 |
| CN | 114578642 | A | 6/2022 |
| CN | 114593689 | A | 6/2022 |
| CN | 114623960 | A | 6/2022 |
| CN | 114624878 | A | 6/2022 |
| CN | 114660683 | A | 6/2022 |
| CN | 114660780 | A | 6/2022 |
| CN | 114690387 | A | 7/2022 |
| CN | 114740631 | A | 7/2022 |
| CN | 114743714 | A | 7/2022 |
| CN | 114779437 | A | 7/2022 |
| CN | 216896898 | U | 7/2022 |
| CN | 216900930 | U | 7/2022 |
| CN | 216901121 | U | 7/2022 |
| CN | 216901165 | U | 7/2022 |
| CN | 216901317 | U | 7/2022 |
| CN | 216901952 | U | 7/2022 |
| CN | 216903719 | U | 7/2022 |
| CN | 216933177 | U | 7/2022 |
| CN | 217034311 | U | 7/2022 |
| CN | 217034418 | U | 7/2022 |
| CN | 217034466 | U | 7/2022 |
| CN | 114859446 | A | 8/2022 |
| CN | 114859447 | A | 8/2022 |
| CN | 114859570 | A | 8/2022 |
| CN | 114935741 | A | 8/2022 |
| CN | 217276608 | U | 8/2022 |
| CN | 217278911 | U | 8/2022 |
| CN | 217278915 | U | 8/2022 |
| CN | 217278989 | U | 8/2022 |
| CN | 217279003 | U | 8/2022 |
| CN | 217279087 | U | 8/2022 |
| CN | 217279110 | U | 8/2022 |
| CN | 217279168 | U | 8/2022 |
| CN | 217279244 | U | 8/2022 |
| CN | 217280797 | U | 8/2022 |
| CN | 217280851 | U | 8/2022 |
| CN | 217281621 | U | 8/2022 |
| CN | 217281623 | U | 8/2022 |
| CN | 114995038 | A | 9/2022 |
| CN | 115016099 | A | 9/2022 |
| CN | 115016150 | A | 9/2022 |
| CN | 115032766 | A | 9/2022 |
| CN | 115047432 | A | 9/2022 |
| CN | 115047653 | A | 9/2022 |
| CN | 115061114 | A | 9/2022 |
| CN | 115079415 | A | 9/2022 |
| CN | 115113174 | A | 9/2022 |
| CN | 217456368 | U | 9/2022 |
| CN | 217465697 | U | 9/2022 |
| CN | 217466052 | U | 9/2022 |
| CN | 217466667 | U | 9/2022 |
| CN | 217467162 | U | 9/2022 |
| CN | 217467176 | U | 9/2022 |

(56) References Cited

FOREIGN PATENT DOCUMENTS

| | | |
|---|---|---|
| CN | 217467177 U | 9/2022 |
| CN | 217467226 U | 9/2022 |
| CN | 217467326 U | 9/2022 |
| CN | 217467327 U | 9/2022 |
| CN | 217467336 U | 9/2022 |
| CN | 217467338 U | 9/2022 |
| CN | 217467351 U | 9/2022 |
| CN | 217467352 U | 9/2022 |
| CN | 217467353 U | 9/2022 |
| CN | 217467355 U | 9/2022 |
| CN | 217467357 U | 9/2022 |
| CN | 217467358 U | 9/2022 |
| CN | 217467363 U | 9/2022 |
| CN | 217467364 U | 9/2022 |
| CN | 217467367 U | 9/2022 |
| CN | 217467368 U | 9/2022 |
| CN | 217467395 U | 9/2022 |
| CN | 217467396 U | 9/2022 |
| CN | 217467399 U | 9/2022 |
| CN | 217467439 U | 9/2022 |
| CN | 217467452 U | 9/2022 |
| CN | 115164714 A | 10/2022 |
| CN | 115166876 A | 10/2022 |
| CN | 115166958 A | 10/2022 |
| CN | 115185082 A | 10/2022 |
| CN | 115211799 A | 10/2022 |
| CN | 115236795 A | 10/2022 |
| CN | 217639515 U | 10/2022 |
| CN | 217639519 U | 10/2022 |
| CN | 217639539 U | 10/2022 |
| CN | 217639544 U | 10/2022 |
| CN | 217639611 U | 10/2022 |
| CN | 217639612 U | 10/2022 |
| CN | 217639613 U | 10/2022 |
| CN | 217639715 U | 10/2022 |
| CN | 217639718 U | 10/2022 |
| CN | 217639719 U | 10/2022 |
| CN | 217639720 U | 10/2022 |
| CN | 217639722 U | 10/2022 |
| CN | 217639723 U | 10/2022 |
| CN | 217639724 U | 10/2022 |
| CN | 217639725 U | 10/2022 |
| CN | 217639726 U | 10/2022 |
| CN | 217639763 U | 10/2022 |
| CN | 217639765 U | 10/2022 |
| CN | 217639767 U | 10/2022 |
| CN | 217639768 U | 10/2022 |
| CN | 217639769 U | 10/2022 |
| CN | 217639770 U | 10/2022 |
| CN | 217639771 U | 10/2022 |
| CN | 217639772 U | 10/2022 |
| CN | 217639773 U | 10/2022 |
| CN | 217639774 U | 10/2022 |
| CN | 217639776 U | 10/2022 |
| CN | 217639777 U | 10/2022 |
| CN | 217639778 U | 10/2022 |
| CN | 217639903 U | 10/2022 |
| CN | 217639920 U | 10/2022 |
| CN | 115268058 A | 11/2022 |
| CN | 115327865 A | 11/2022 |
| CN | 115332917 A | 11/2022 |
| CN | 115343795 A | 11/2022 |
| CN | 115390176 A | 11/2022 |
| CN | 217809433 U | 11/2022 |
| CN | 217818613 U | 11/2022 |
| CN | 217819022 U | 11/2022 |
| CN | 217820828 U | 11/2022 |
| CN | 217820829 U | 11/2022 |
| CN | 217820831 U | 11/2022 |
| CN | 217820834 U | 11/2022 |
| CN | 217820838 U | 11/2022 |
| CN | 217820839 U | 11/2022 |
| CN | 217820840 U | 11/2022 |
| CN | 217820943 U | 11/2022 |
| CN | 217820944 U | 11/2022 |
| CN | 217820945 U | 11/2022 |
| CN | 217820971 U | 11/2022 |
| CN | 217821058 U | 11/2022 |
| CN | 217821068 U | 11/2022 |
| CN | 217821071 U | 11/2022 |
| CN | 217821091 U | 11/2022 |
| CN | 217821110 U | 11/2022 |
| CN | 217821111 U | 11/2022 |
| CN | 217821113 U | 11/2022 |
| CN | 217821122 U | 11/2022 |
| CN | 217821160 U | 11/2022 |
| CN | 217821236 U | 11/2022 |
| CN | 217821680 U | 11/2022 |
| CN | 217821696 U | 11/2022 |
| CN | 217822825 U | 11/2022 |
| CN | 217823690 U | 11/2022 |
| CN | 217825178 U | 11/2022 |
| CN | 217885960 U | 11/2022 |
| CN | 217902220 U | 11/2022 |
| CN | 217902222 U | 11/2022 |
| CN | 115421295 A | 12/2022 |
| CN | 115453754 A | 12/2022 |
| CN | 115524768 A | 12/2022 |
| CN | 115524775 A | 12/2022 |
| CN | 115524874 A | 12/2022 |
| CN | 217981833 U | 12/2022 |
| CN | 217981857 U | 12/2022 |
| CN | 217981991 U | 12/2022 |
| CN | 217981992 U | 12/2022 |
| CN | 217982020 U | 12/2022 |
| CN | 217982038 U | 12/2022 |
| CN | 217982089 U | 12/2022 |
| CN | 217982120 U | 12/2022 |
| CN | 217983382 U | 12/2022 |
| CN | 217984044 U | 12/2022 |
| CN | 117378105 A | 1/2024 |
| DE | 102007058558 A1 | 6/2009 |
| DE | 102012212753 A1 | 1/2014 |
| DE | 102015221985 A1 | 5/2017 |
| DE | 102016218996 A1 | 9/2017 |
| EP | 1251397 A2 | 10/2002 |
| EP | 1252623 B1 | 10/2004 |
| EP | 2338114 B1 | 3/2017 |
| EP | 3226042 A1 | 10/2017 |
| EP | 3385770 A1 | 10/2018 |
| EP | 4348780 A1 | 4/2024 |
| GB | 2499869 B | 3/2018 |
| JP | 2017062373 A | 3/2017 |
| JP | 2019086765 A | 6/2019 |
| JP | 2020537193 A | 12/2020 |
| JP | 2024522080 A | 6/2024 |
| KR | 20080099452 A | 11/2008 |
| KR | 20080103149 A | 11/2008 |
| KR | 20090002583 A | 1/2009 |
| KR | 101493928 B1 | 3/2015 |
| KR | 20170015109 A | 2/2017 |
| KR | 20180121309 A | 11/2018 |
| KR | 101905444 B1 | 12/2018 |
| KR | 102036640 B1 | 10/2019 |
| KR | 20240012444 A | 1/2024 |
| WO | 2007141788 A2 | 12/2007 |
| WO | 2009124181 A2 | 10/2009 |
| WO | 2012172366 A1 | 12/2012 |
| WO | 2015077926 A1 | 6/2015 |
| WO | 2016051325 A1 | 4/2016 |
| WO | 2016191142 A2 | 12/2016 |
| WO | 2017005709 A1 | 1/2017 |
| WO | 2018118984 A1 | 6/2018 |
| WO | 2018134215 A1 | 7/2018 |
| WO | 2018142339 A1 | 8/2018 |
| WO | 2018204856 A1 | 11/2018 |
| WO | 2018218063 A1 | 11/2018 |
| WO | 2018219710 A1 | 12/2018 |
| WO | 2018222944 A1 | 12/2018 |
| WO | 2019015735 A1 | 1/2019 |
| WO | 2019039241 A1 | 2/2019 |
| WO | 2019043016 A1 | 3/2019 |
| WO | 2019057907 A1 | 3/2019 |
| WO | 2019075335 A1 | 4/2019 |

(56) References Cited

FOREIGN PATENT DOCUMENTS

| | | |
|---|---|---|
| WO | 2019101750 A2 | 5/2019 |
| WO | 2019108290 A1 | 6/2019 |
| WO | 2019116364 A1 | 6/2019 |
| WO | 2019118646 A1 | 6/2019 |
| WO | 2019119025 A1 | 6/2019 |
| WO | 2019136166 A1 | 7/2019 |
| WO | 2019148200 A1 | 8/2019 |
| WO | 2019164542 A1 | 8/2019 |
| WO | 2019164849 A1 | 8/2019 |
| WO | 2019173357 A1 | 9/2019 |
| WO | 2019198568 A1 | 10/2019 |
| WO | 2019204667 A1 | 10/2019 |
| WO | 2019206430 A1 | 10/2019 |
| WO | 2020001938 A1 | 1/2020 |
| WO | 2022251843 A1 | 12/2022 |

OTHER PUBLICATIONS

International Search Report and Written Opinion for International Application No. PCT/US2022/072562, Search completed Aug. 31, 2022, Mailed Oct. 5, 2022, 60 pgs.
Extended European Search Report for European Application No. 22812382.4, Search completed Mar. 13, 2025, Mailed Mar. 26, 2025, 8 pgs.
Cheng et al., "Ultra-compact structured light projector with all-dielectric metalenses for 3D sensing", AIP Advances, American Institute of Physics, vol. 9, No. 10, Oct. 9, 2019, pp. 105016-1-105016-7, XP012241281, doi: 10.1063/1.5121348.

\* cited by examiner

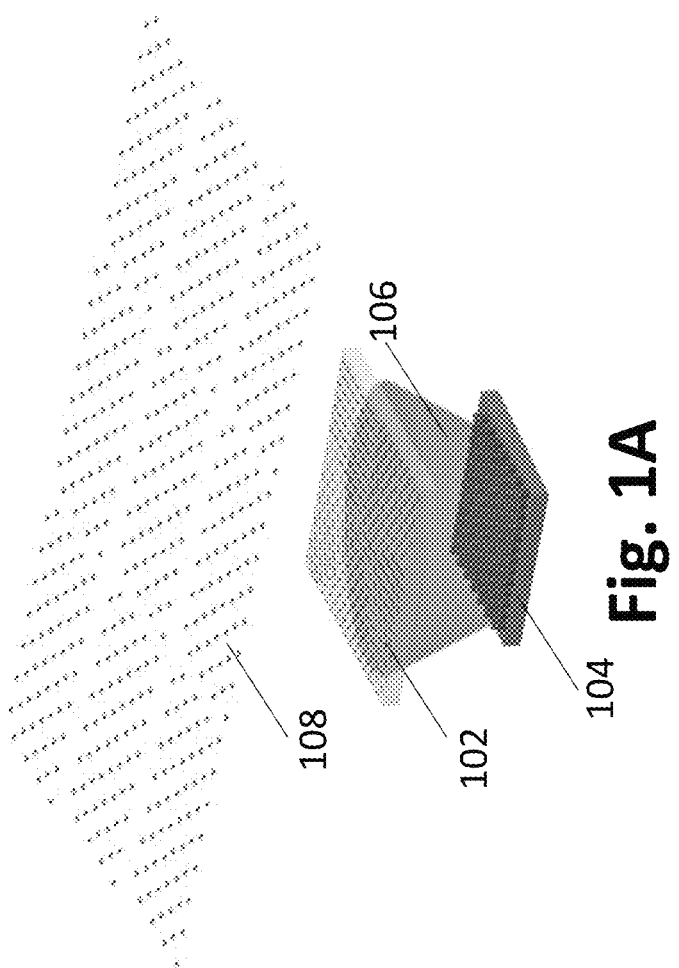

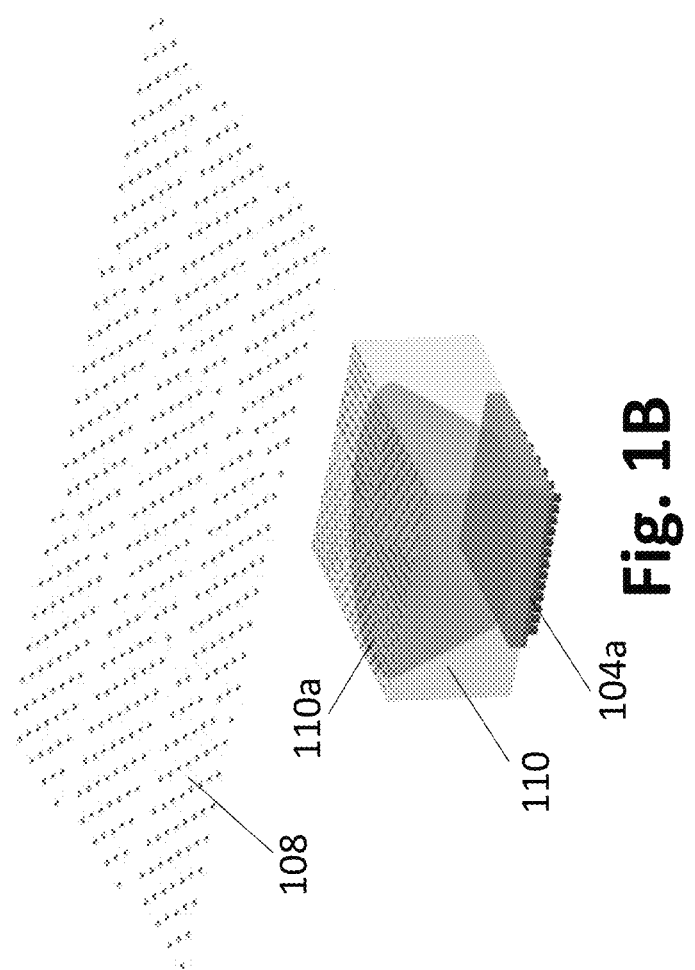

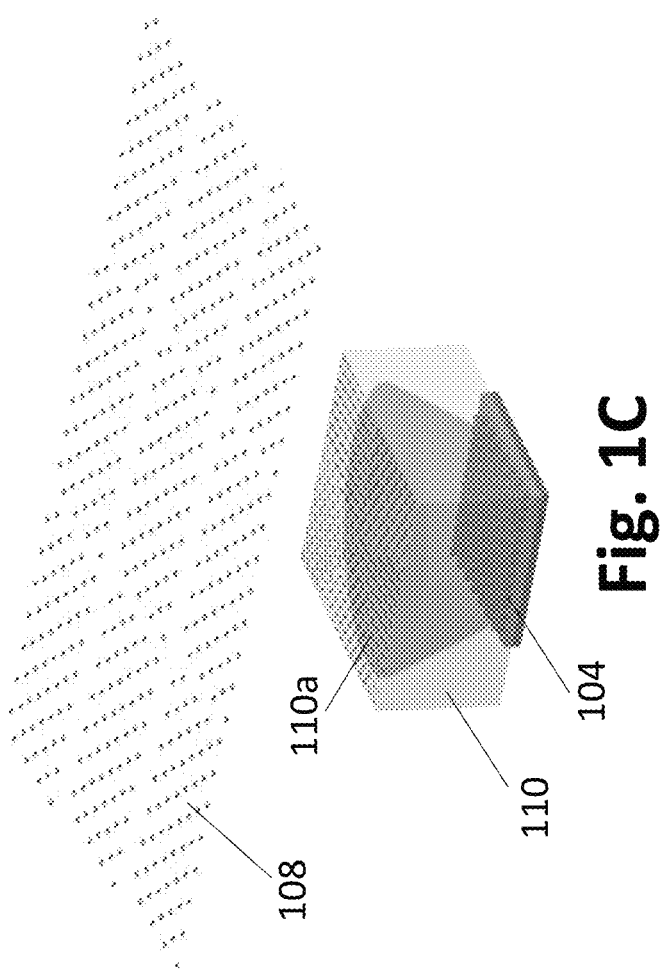

| Parameters | Target | Unit | Design 1.1 | Design 1.2 |
|---|---|---|---|---|
| Wavelength | 940 | nm | 940 | 940 |
| TTL | 4.2 | mm | 4.697 | 4.667 |
| VCSEL <-> Substrate | - | mm | 3.922 | 3.892 |
| Substrate thickness | - | mm | 0.775 | 0.775 |
| MS facing direction | - | - | VCSEL | VCSEL |
| Dot FW 1/e^2 (center) | 0.07 | deg | 0.18 | 0.15 |
| Projection FOI, H [from corner] (from edge) | 16.8 | deg | [17.42] (17.36) | [17.51] (17.47) |
| Projection FOI (V) [from corner] (from edge) | 15.2 | deg | [14.52] (14.44) | [14.59] (14.54) |

Fig. 3

| VCSEL x | mm | 0.860 |
| VCSEL y | mm | 0.612 |
| | | |
| C | mm | 2.450 |
| Theta | deg | 30.0 |
| B | mm | 0.025 |
| Border | mm | 0.300 |
| | | |
| MSX | mm | 2.198 |
| MSY | mm | 1.950 |
| | | |
| ChipX | mm | 2.798 |
| ChipY | mm | 2.550 |

Fig. 8

SINGLE ELEMENT DOT PATTERN PROJECTOR

CROSS-REFERENCE TO RELATED APPLICATIONS

This application claims the benefit of and priority under 35 U.S.C. § 119(e) to U.S. Provisional Patent Application Ser. No. 63/192,962, entitled "Single Flat Optical Element Dot Pattern Projector" and filed May 25, 2021, which is incorporated herein by reference in its entirety for all purposes.

FIELD OF THE INVENTION

The current disclosure is directed to a single element dot pattern projector with a metasurface (sometimes called a meta-optic), and methods of forming a dot pattern with a VCSEL array.

BACKGROUND OF THE INVENTION

Metasurface dot pattern projectors are optical devices that transform a laser source or multiple laser sources into a multitude of dots and collimate the output beam. In general, the number of dots projected from the device is greater than that of the single or multiple laser sources and the full width at half max (FWHM) of the divergence of the outgoing light is targeted to be minimized. For example, a dot pattern projector may transform a vertical cavity surface emitting laser (VCSEL) with 20 individual laser apertures into 20×N dots where each dot is targeted to have less then 0.50 degree FWHM.

Dot pattern projectors have a number of applications in 3D sensing but nearly all 3D sensing dot projector modules in consumer applications make use of a VCSEL source. The specifics of the dot pattern projected onto a scene depends on the application in which the projector is being used. In time of flight (ToF) imaging, the target number of dots in the far field may be just a 10× multiplication of the number of laser apertures. In structured light, in contrast, the number of dots projected may 100× the number of VCSEL apertures.

Because of the multiple goals of a dot pattern projector, i.e., multiplying the VCSEL pattern, achieving a high degree of collimation in the laser output and minimizing the overall form factor of the device, dot pattern projector modules are typically comprised of many individual optical components. For example, a standard dot projector module designed to fit into a mobile device requires at least one and typically three refractive lenses to collimate the laser light and one diffractive optical element (DOE) which will replicate the baseline number of VCSEL apertures and produce the desired number of dots in the far field. The module complexity, as a result, presents a significant challenge for integration and furthermore the module thickness is often greater than the space available in the bezel of the phone, laptop or display. The latter limitation leads to more complex integration schemes such as folded optical light paths.

BRIEF SUMMARY OF THE INVENTION

The application is directed to a single element dot pattern projector with a metasurface (sometimes called a meta-optic), and methods of forming a dot pattern with a VCSEL array.

Various embodiments of the invention include a single element dot pattern projector including: a laser light source; and a metasurface chip integrated onto the laser light source. The metasurface chip includes metasurface elements spaced apart from the laser light source by a distance equal to a back focal length of the metasurface chip, and the laser light source produces light which is diffracted through the metasurface elements to produce a dot pattern.

In various other embodiments, the laser light source includes a vertical cavity surface emitting laser (VCSEL).

In still various other embodiments, the VCSEL includes multiple individual laser apertures.

In still various other embodiments, the individual laser apertures are configured to output dots having less than 0.5 degrees full width half maximum (FWHM).

In still various other embodiments, the metasurface chip has dimensions that satisfy the following equations:

$$MSx = VCSELx + 2*A + B; \text{ and } A = C*\tan\left(\frac{\theta}{2}\right),$$

where B is the alignment tolerance of the metasurface chip, and θ is the full angle where the laser light source power falls to less than 0.5% of the total power, and where MSx is the width of the active area of the metasurface chip in the x direction, VCSELx is the width of the laser light source in the x direction, A is the estimated size of the laser light source beam beyond the VCSELx in the x direction, and C is a gap size between the laser light source and the metasurface chip which is equal to the back focal length of the metasurface chip.

In still various other embodiments, the metasurface chip has a chip width in the x direction of MSx+2*Border, where Border is the size of the chip beyond the estimated size of the light source beam in the x direction.

In still various other embodiments, the metasurface chip is integrated above the laser light source such that the laser light source outputs light through a gap between the metasurface elements and the laser light source.

In still various other embodiments, the metasurface chip is integrated above the backside of the laser light source such that light is outputted through the backside of the laser light source onto the metasurface chip.

In still various other embodiments, the metasurface chip is integrated above the frontside of the laser light source such that light is outputted through the frontside of the laser light source onto the metasurface chip.

In still various other embodiments, the gap is provided by a substrate of the metasurface chip.

In still various other embodiments, the gap is provided by an epoxy or air between the laser light source and the metasurface elements.

In still various other embodiments, the metasurface elements are positioned at the top of a substrate of the metasurface chip.

In still various other embodiments, the metasurface chip provides both a lens function and a multiplication function to the light from the laser light source.

In still various other embodiments, the metasurface chip further provides a linear phase function to the light from the laser light source.

In still various other embodiments, the dot pattern has an asymmetric pattern.

In still various other embodiments, the laser light source is integrated into a chip and the laser light source chip and the metasurface chip are integrated into a single monolithic module.

In still various other embodiments, the metasurface elements are organized into multiple hexagonally shaped tiles.

Further, many embodiments of the invention include a method of forming a dot pattern with a laser light source, the method including: providing the laser light source integrated into a chip; providing a metasurface chip including metasurface elements; integrating the laser light source chip with the metasurface chip such that the metasurface elements are spaced apart from the laser light source by a distance equal to a back focal length of the metasurface chip; and producing light from the laser light source which is diffracted through the metasurface elements to produce the dot pattern.

In various other embodiments, the laser light source includes a vertical cavity surface emitting laser (VCSEL).

In still various other embodiments, the metasurface chip has dimensions that satisfy the following equations:

$$MSx = VCSELx + 2*A + B; \text{ and } A = C*\tan\left(\frac{\theta}{2}\right),$$

where B is the alignment tolerance of the metasurface chip, and θ is the full angle where the laser light source power falls to less than 0.5% of the total power, and where MSx is the width of the active area of the metasurface chip in the x direction, VCSELx is the width of the laser light source in the x direction, A is the estimated size of the laser light source beam beyond the VCSELx in the x direction, and C is a gap size between the laser light source and the metasurface chip which is equal to the back focal length of the metasurface chip.

In still various other embodiments, the metasurface chip has a chip width in the x direction of MSx+2*Border, where Border is the size of the chip beyond the estimated size of the light source beam in the x direction.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 1A provides a schematic of a single meta-optic positioned over a VCSEL array according to embodiments.

FIG. 1B provides a schematic of a single meta-optic that has been directly integrated to a backside emitting VCSEL array die, creating a monolithic unit according to embodiments.

FIG. 1C provides a schematic of a meta-optic integrated to a front side emitting VCSEL array die according to embodiments.

FIG. 3 provides a set of example design parameters for a meta-optic that combines all three functions in a single planar layer according to embodiments.

FIG. 8 provides an example of calculated meta-optic dimensions according to embodiments.

DETAILED DESCRIPTION OF THE INVENTION

Figure 2:
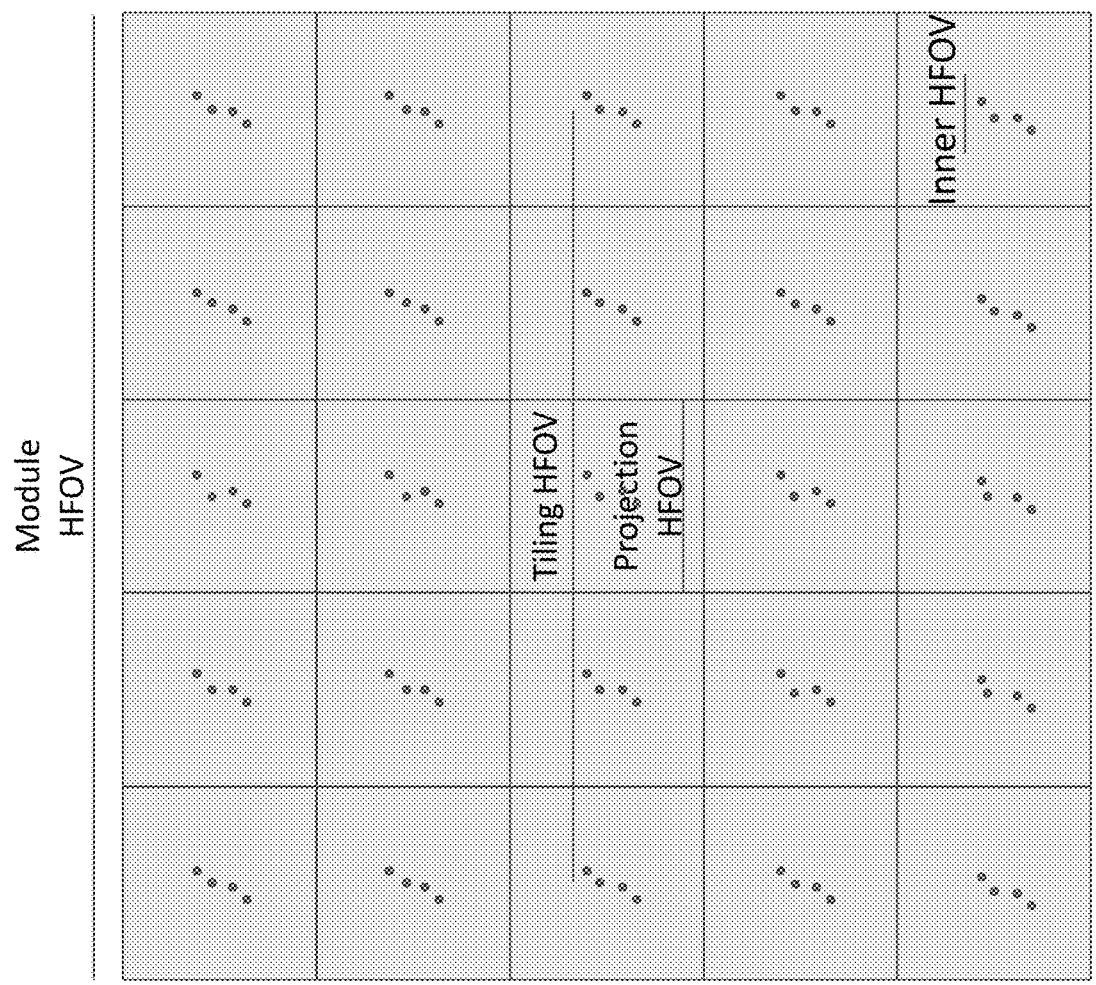
FIG. 2 provides a schematic of the full function that the single meta-optic produces according to embodiments.

Turning now to the drawings, disclosed herein is a single element dot pattern projector with a metasurface (sometimes called a meta-optic). Many embodiments describe various implementations of a flat meta-optic as they relate to optimizing performance of dot projector modules while significantly simplifying the system. In additional embodiments, designs enabled by meta-optics leads to unique methods of integrating the meta-optic and unique functionality that can be added to the dot pattern. Various embodiments also relate to forming a dot pattern with a VCSEL array as the source, however, it will be recognized that embodiments are also applicable to a variety of different laser light sources. For example, the laser light source may be a solid state laser or any laser system and optics.

The use of a flat meta-optic, according to embodiments, allows systems to be telecentric in object space (e.g., at the plane of the VCSEL apertures) with just a single element and project the VCSELs apertures to infinity. In various embodiments, the meta-optic can be designed to impart a relatively simple phase profile described as a radial expansion of the phase profile. Embodiments are also able to add a multifunctional design to the single meta-optic. Such multifunctional designs allow the optics to impart three or more functions into the single metasurface layer.

In an exemplary embodiment, a lens function is imparted in the same metasurface layer as a diffractive function that creates M replicas of each single VCSEL aperture. This is in contrast to existing dot pattern projectors where the lens function may be imparted by a separate refractive element and the replication function is imparted by a diffractive optical element (DOE). In some embodiments, the lens function may be combined in a single metasurface which also has a first diffractive function which produces N replicas of the VCSEL aperture over relatively narrow field of view (the inner field of view, IFOV) and a second diffractive function which further creates P replicas of the IFOV pattern over a larger field of view (the outer field of view OFOV). In such an embodiment, if the VCSEL array is made up of Q apertures, the single meta-optic may produce Q×N×P points of collimated light in the far field. As a result of combining the refractive lens function and diffractive lens functions into the single metasurface layer, all optical functions for the dot pattern projector may be imparted at the same plane, which may result in one focal length from the plane of the VCSEL.

This elimination of the refractive lenses in a standard dot pattern projector provides a unique integration of the meta-optic with the underlying VCSEL array. Typical dot projector modules include an airgap between the VCSEL array and the refractive lenses. However, in the embodiments described here, the meta-optic can be directly integrated with the VCSEL array chip, creating a monolithic module. Such direct integration can be accomplished with a front side emitting VCSEL. An epoxy may be utilized to secure the meta-optic die to the VCSEL array. In some embodiments, the meta-optic can be integrated on a back side emitting VCSEL array. In this implementation, the integration may be accomplished through an oxide bond, layer transfer process or with an optically transparent epoxy.

In many embodiments, the flat meta-optic is a distance from the VCSEL that is equal to the back focal length of metasurface elements on the metasurface chip. Thus, in such a device, the multiplication function and focal length of the collimating lens may be co-planar. For example, both functions may be imparted in a single metasurface at the same distance from the VCSEL array. This is in contrast to standard dot pattern projectors. In standard dot pattern projectors the focal length of the collimating lens may be at a different plane than the multiplication function. For example, the lens function may be at a distance of the focal length away from the VCSEL array plane while the diffractive optical element which imparts the multiplication function may be at an additional displacement from the refractive lens and at a separate plane than the refractive lens. Further, in contrast to the embodiments described herein, in the standard dot pattern projector the light incident on the diffractive optical elements (DOE) (e.g. the optic performing the pattern multiplication) may already be collimated by the separate refractive lens or lenses. However, for the single meta-optic dot pattern projector, the light incident on the meta-optic (which is also the plane of the multiplication function) may diverge with the same divergence angle as the VCSEL and the light chief ray angle may be 0 degrees at every point along the meta-optic since there are no other collimating or lensing elements prior to the light being incident on the meta-optic. The light incident on the meta-optic may not be separately collimated prior to being incident on the meta-optic.

In some embodiments, the single meta-optic dot projector may include a large module field of view (FOV) as compared to conventional projectors. In this example, the diagonal module FOV can be as large as 150 degrees. The inclusion of a flat optic may allow the meta-optic dot projector to bend light at high angles. As light bends to high angles, the multi-level DOE may have significant vignetting caused by the different physical heights. In contrast to a multi-level DOE, the meta-optic may have only a single physical height.

Implementing a dot projector with a meta-optic also allows additional unique functionality to be imparted to the device. In a traditional dot projector including standard optics, the dots in the projected dot pattern may be unpolarized or, all dots may have nominally the same polarization (e.g. no preferential polarization). In some embodiments, the meta-optic dot pattern projector may allow the polarization of each individual dot to be controlled. In such an embodiment, the metasurface dot pattern projector takes either unpolarized, partially polarized, or single polarization light incident from the VCSEL array and converts the outgoing light into two arbitrary, orthogonal polarization states. In some embodiments, the dot pattern may be separated into two preferential polarizations for the left and right half of the projected pattern. Alternatively, every column of dots or neighboring dots may have opposite polarization. In certain specific cases the two polarizations of the dots may be left and right circular polarizations. In some embodiments, the meta-optic may convert the outgoing light into more than two polarization states.

Specifically, in various embodiments of dot pattern projectors in structured light applications, it may be advantageous to have a random or pseudo-random output pattern projected onto the scene. Such randomness may be achieved through introducing a random distribution in the placement of the VCSEL apertures in the VCSEL array. The dot pattern may then be generated through replicating the random array of VCSEL apertures in the far field. This method is typically implemented because of limitations in the functionality of the multiplication DOE used in traditional dot pattern projectors. In some embodiments, the meta surface dot projector described herein allows complete control of the phase of light from 0 to 2pi at a single flat optical plane. This allows the metasurface to impart asymmetric and arbitrary patterns compared to a binary diffractive, which can only produce symmetric patterns or a multi-level DOE which requires multiple physical heights in the underlying structures to produce a 0 to 2pi phase shift. A meta-optic allows an arbitrary radiation pattern to be transformed into a different outgoing arbitrary radiation pattern. Thus, in the case of a single meta-optic being used in a dot pattern projector, a collimated, random dot array in the far field using a VCSEL array may be produced with a regular grid (e.g., non-random) of VCSEL apertures. Importantly, the meta-optic can produce a dot pattern in the far field that is random across the entire module FOV. In a traditional dot pattern projectors, in contrast, each individual tile may have a random array of dots but that random array may be repeated.

In traditional dot projectors, the desired module FOV and number of times the pattern may be multiplied (e.g., how many dots are produced in the far field) may set the projection FOV. Following this from standard paraxial optics, the number of pattern replications may set the total track length of the module. In some embodiments, the single meta-optic may transform a regular VCSEL array directly into a far-field pattern which may remove this limitation. Instead, the module FOV may directly set the total track length, allowing for a significantly thinner module.

In certain embodiments, it may be desirable for the projected dot pattern to be skewed along a certain angular direction. Specifically, the field of view of a standard dot projector may be symmetric about the optical axis. However, in certain embodiments, it may be desirable to compensate optically, rather than mechanically, for cases where the optical axis of dot projector is not orthogonal to the plane of the object. In some embodiments, the meta-optic dot pattern projector may include an additional linear phase function, e.g. $\phi(x)=Ax$, where x is the cartesian coordinate and A is a phase constant, in addition to the lens and pattern multiplication function. Again from a standard dot projector, such asymmetry cannot be introduced. With the single meta-optic approach according to embodiments, however, a design with arbitrary asymmetry to the outgoing FOV can be included.

The general design freedom of the meta-optic approach according to embodiments also allows unique aspects to be imparted upon the individual tiles of the dot pattern itself. Specifically the meta-optic enabled projection can allow each tile to have a different focal length, dot size, unique wavefront or slant to the wavefront. Such freedom allows unique optimization of the tiles at larger angles within the module field of view compared to those within smaller angles within the field of view. The ability to optimize each individual tile also enables each tile to have a unique pattern on the inner field of view. This allows one to uniquely specify the dot density, for example, at different regions within the field of illumination.

Exemplary Embodiments

The following embodiments are provided as examples and are not to be construed as limiting the scope of the instant disclosure.

FIG. 1A illustrates a single meta-optic dot projector in accordance with an embodiment of the invention. The projector includes a VCSEL 104 and a metasurface chip 102 positioned over the VCSEL 104. A gap 106 is positioned between the VCSEL 104 and the metasurface chip 102 such that light from the VCSEL 104 is outputted through the gap 106 onto the metasurface chip 102. The gap 106 may be air. The metasurface chip 102 may include a metasurface which both focuses and multiplies the light from the VCSEL 104 to produce a dot pattern 108. The VCSEL 104 may be a front side outputting VCSEL.

FIG. 1B illustrates a single meta-optic dot projector in accordance with an embodiment of the invention. The operation of the projector of FIG. 1B is similar to that of FIG. 1A. A VCSEL 104a may be a backside outputting VCSEL which may output light out of the backside of the VCSEL 104a. A metasurface chip 102a may include a substrate which may directly contact the VCSEL 104a and may produce a gap between the metasurface 110a of the metasurface chip 102a and the VCSEL 104a.

FIG. 1C illustrates a single meta-optic dot projector in accordance with an embodiment of the invention. The operation of the projector of FIG. 1C is similar to that of FIG. 1B. Further, the projector of FIG. 1C includes many identically numbered components to the projector of FIG. 1B. The description of these components will not be repeated in detail. The VCSEL 104 may be a front side outputting VCSEL similar to the projector described in connection with FIG. 1A.

Advantageously, the metasurface chip may be directly integrated to a backside or frontside emitting VCSEL array die, creating a monolithic unit. The VCSEL 104, 104a may output light with a wavelength of 940±10 nm or 850±10 nm.

FIG. 2 shows a schematic of the full function that the single meta-optic dot projector produces in accordance with an embodiment of the invention. The collimation function of the single meta-optic may produce a projection with a certain horizontal field of view (HFOV). The meta-optic also produces an inner dot pattern with an inner horizontal field of view (IHFOV). The IHFOV is generally much narrower than the projection HFOV. The IHFOV and projection HFOV may be replicated by a third function, the tiling function. The tiling HFOV is shown on the schematic. The combination of these three functions gives the dot projector a full module HFOV shown on the schematic. In various embodiments, all of these functions may be achieved by a single meta-optic at a singular plane within the module. FIG. 3 shows a set of example design parameters for a meta-optic that combines all three functions in a single planar layer according to embodiments.

Figure 4:
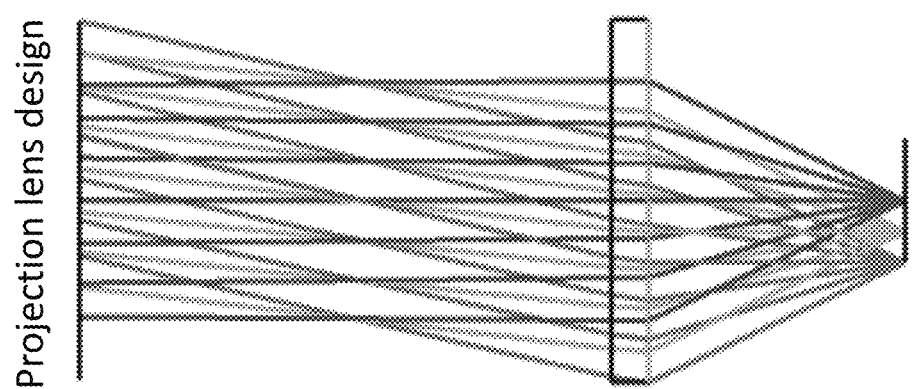
FIG. 4 provides a ray trace of the projection lens function of the meta-optic according to embodiments.

FIG. 4 provides a ray trace of the projection lens function of the meta-optic according to embodiments. As can be seen from the image it is possible to achieve telecentric performance with the flat meta-optic. This is critical for performance of the dot projector, especially in achieving a high degree of collimation off-axis. The lens in this example uses a relatively simple radial phase expansion, only utilizing terms out to the 6th degree. However, in some embodiments, higher order terms can be added if desired.

Figure 5:
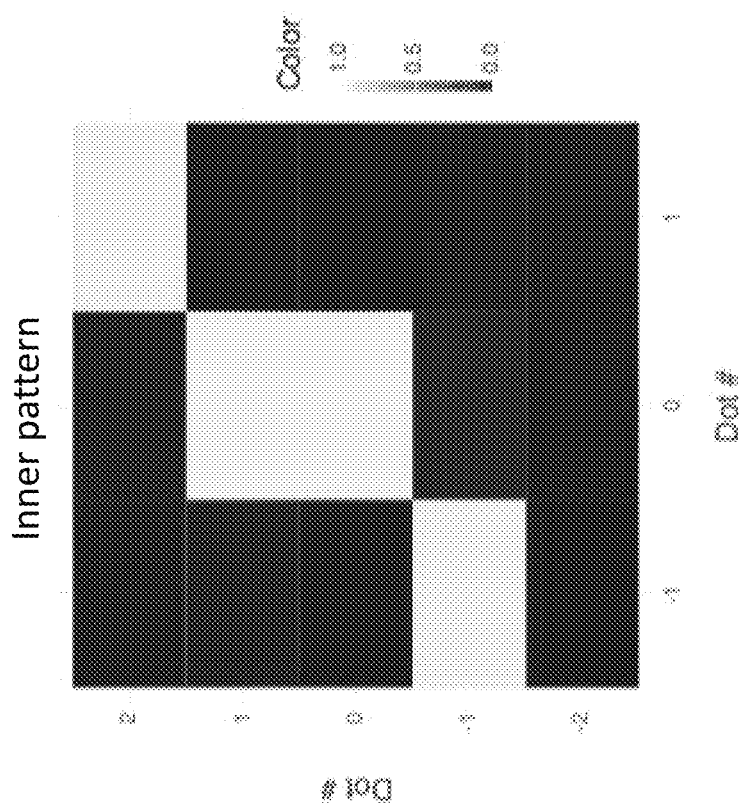
FIG. 5 provides an example of a pattern designed for the IFOV of a meta-optic dot pattern projector according to embodiments.

FIG. 5 provides an example of a pattern designed for the IHFOV of a meta-optic dot pattern projector according to embodiments. In this example (meant to be demonstrative not limiting) the IHFOV may be achieved by choosing a diffractive grid of 3×5 diffractive orders. Within this grid the certain orders are designed to be "on" and certain orders are designed to be "off", where a grid that is "on" will have a certain intensity of light and the grid that is "off" will have substantially less or ideally no light intensity. In certain embodiments, it may be advantageous for there to be a certain rotational symmetry to the "on" orders. Such symmetry promotes certain key performance metrics such as minimizing stray light and increasing dot contrast.

Figure 6:
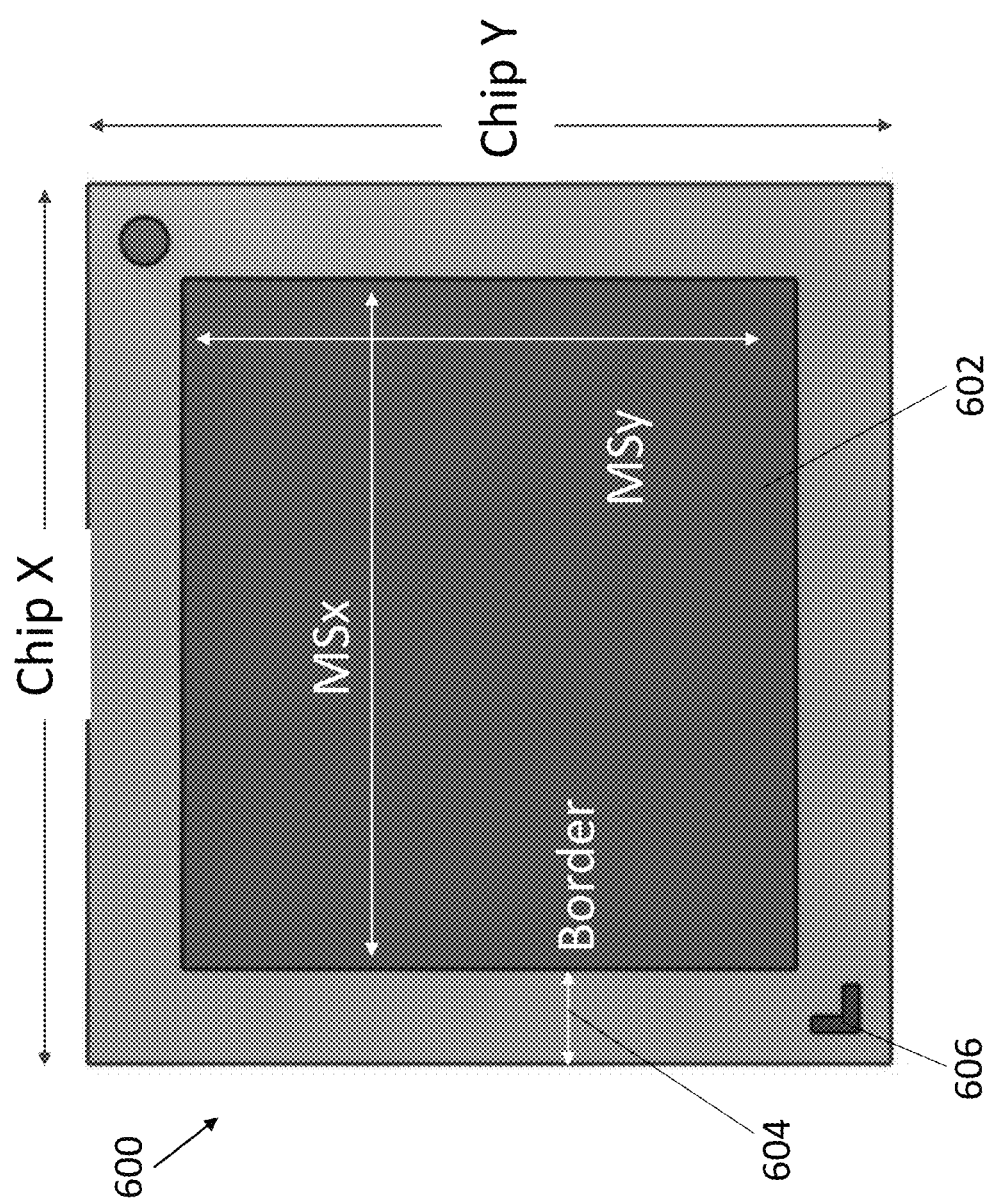
FIG. 6 provides a top view of the meta-optic die according to embodiments.

FIG. 6 is a schematic of a top view of a metasurface chip in accordance with an embodiment of the invention. Unlike conventional refractive lenses which are generally radially symmetric the metasurface chip may be in square or rectangular shapes. The metasurface chip 600 may include an active area 602 surrounded by a border 604. The active area 602 may include various metasurface elements. The metasurface chip may also include orientation and alignment fiducial marks 606 which may be used during the manufacturing of the chip. The active area 602 may include an X dimension MSx and a Y dimension MSy. MSx and MSy can be determined by VCSEL divergence and total track length (TTL).

The metasurface elements may include high-index structures which are incorporated onto a substrate. The metasurface elements may be high-index structures which are embedded within a dielectric material. For example, the metasurface elements may include a high index dielectric (e.g. silicon) embedded in a low-index dielectric (e.g. $SiO_2$) The high-index structures may be pillars which are positioned on the substrate. The pillars may have a multitude of cross sections including circular, rectangular, and/or cross shaped. The pillars may have a high aspect ratio. The pillars may have a height of 600 nm to 800 nm. In some embodiments, the pillars may have a height of about 700 nm. The diameter of the pillars may be 80 nm to 300 nm. Examples of metasurface elements are disclosed in U.S. Pat. Pub. No. 2019/0064532, entitled "Transmissive Metasurface Lens Integration" and filed Aug. 31, 2018 which is incorporated by reference in its entirety for all purposes. In some embodiments, anti-reflective layers may be positioned above and/or below the metasurface elements.

Figure 7:
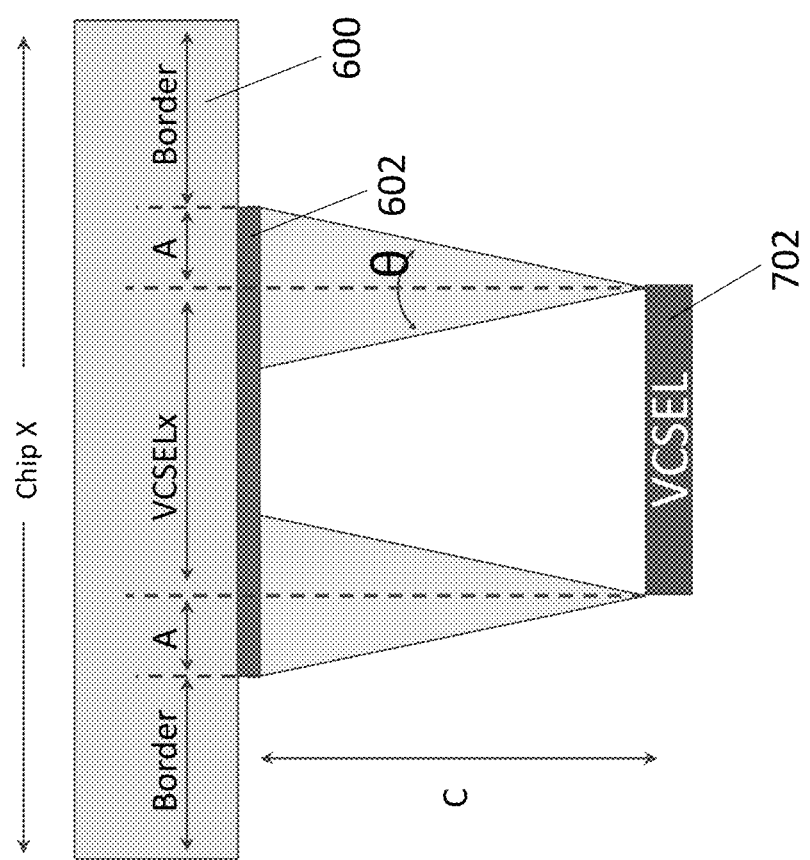
FIG. 7 provides a schematic side view of the single meta-optic dot pattern projector according to embodiments.

FIG. 7 provides a schematic side view of a single meta-optic dot pattern projector including the metasurface chip 600 of FIG. 6. The projector includes a VCSEL array 702 which emits light with a certain beam width including a divergence angle θ. The VCSEL 702 may be spaced apart from the metasurface chip by a distance equal to a back focal length C of the metasurface chip, which may be equal to the focal length. Given the back focal length C, the VCSEL divergence angle θ and the VCSEL array dimensions VCSELx may yield a certain dimension for the metasurface chip 600. These dimensions may be calculated by the following equations:

$$MSx = VCSELx + 2A + B$$

$$A = C * \tan\left(\frac{\theta}{2}\right)$$

$$\text{Chip } X = MSx + 2 * \text{Border}$$

B may be the alignment tolerance of the metasurface chip 600 which may be 25 μm. The divergence angle θ may be the full angle where VCSEL power falls to less than 0.5% of the total power. MSx may be the width of the active area of the metasurface chip in the x direction. VCSELx may be the width of the light source in the x direction. A may be the estimated size of the light source beam beyond the VCSELx in the x direction. Border is the size of the chip beyond the estimated size of the light source beam in the x direction.

The dimensions of the VCSEL array 702 may provide a unique mapping to the metasurface chip 600 dimensions. While a certain metasurface chip 600 dimensions can be chosen to maximize the amount of light that falls onto the metasurface chip 600, the dimension can also be made substantially smaller in order to produce a smaller meta-optic size at the expense of power lost from the VCSEL array 702 and not projected into a dot pattern. As can be seen from the figure, unlike a conventional dot pattern projector, the light incident on the plane of multiplication function may be divergent by divergence angle θ. FIG. 8 provides an example of calculated metasurface chip 600 dimensions according to embodiments.

The metasurfaces may have a lattice or pitch. A unit cell may be defined as a single pillar of the metasurface and the pillars may be spaced center-to-center by a unit cell lattice or pitch. The diameter of the pillars may vary which gives the metasurface its function. In general, two basis vectors define the lattice that the metasurfaces are defined on. The spacing or pitch may be a subwavelength of λ/2. A supercell helps define the tiling function of the metasurface and it too is defined by basis vectors. Given the target diffraction angles, the supercell basis vectors are the reciprocal lattice vectors of the target wavevectors. The target diffraction angles may be target wavevectors.

The unit cell pitch may be chosen so that an integer multiple of the unit cells is equal to the target diffraction angle pitch. In the simplest case, this satisfies the following equation:

$$N * \text{lattice}_{unit\ cell} = \text{lattice}_{supercell}$$

Where N is an integer value. Where $\text{lattice}_{unit\ cell}$ is the unit cell lattice and $\text{lattice}_{supercell}$ is the target diffraction angle lattice. Where through the diffractive grating equation, the $\text{lattice}_{supercell}$ can be calculated from the target angle through the following equation:

$$\frac{\lambda}{n * \sin(\theta_{target})} = \text{lattice}_{supercell}$$

Where n is the refractive index of the medium, λ is the design wavelength, and $\theta_{target}$ is the target diffraction angle. In the general case, a higher order diffraction angle may be targeted such that the following equation is satisfied:

$$\frac{M * \lambda}{n * \sin(\theta_{target})} = \text{lattice}_{supercell}$$

Where M is an integer which labels the targeted diffraction order.

Because the unit cell is on a 2D lattice, generally the lattice supercell constraint may be satisfied so that the follow equation is satisfied:

$$N1 * \text{lattice}_{unit\ cell\ 1} + N2 * \text{lattice}_{unit\ cell\ 2} = \text{lattice}_{supercell}$$

$$N3 * \text{lattice}_{unit\ cell\ 1} + N4 * \text{lattice}_{unit\ cell\ 2} = \text{lattice}_{supercell\ 2}$$

The lattice vectors may not be orthogonal, or aligned to the x or y direction. N1, N2, N3, and N4 are all integers.

Figure 9:
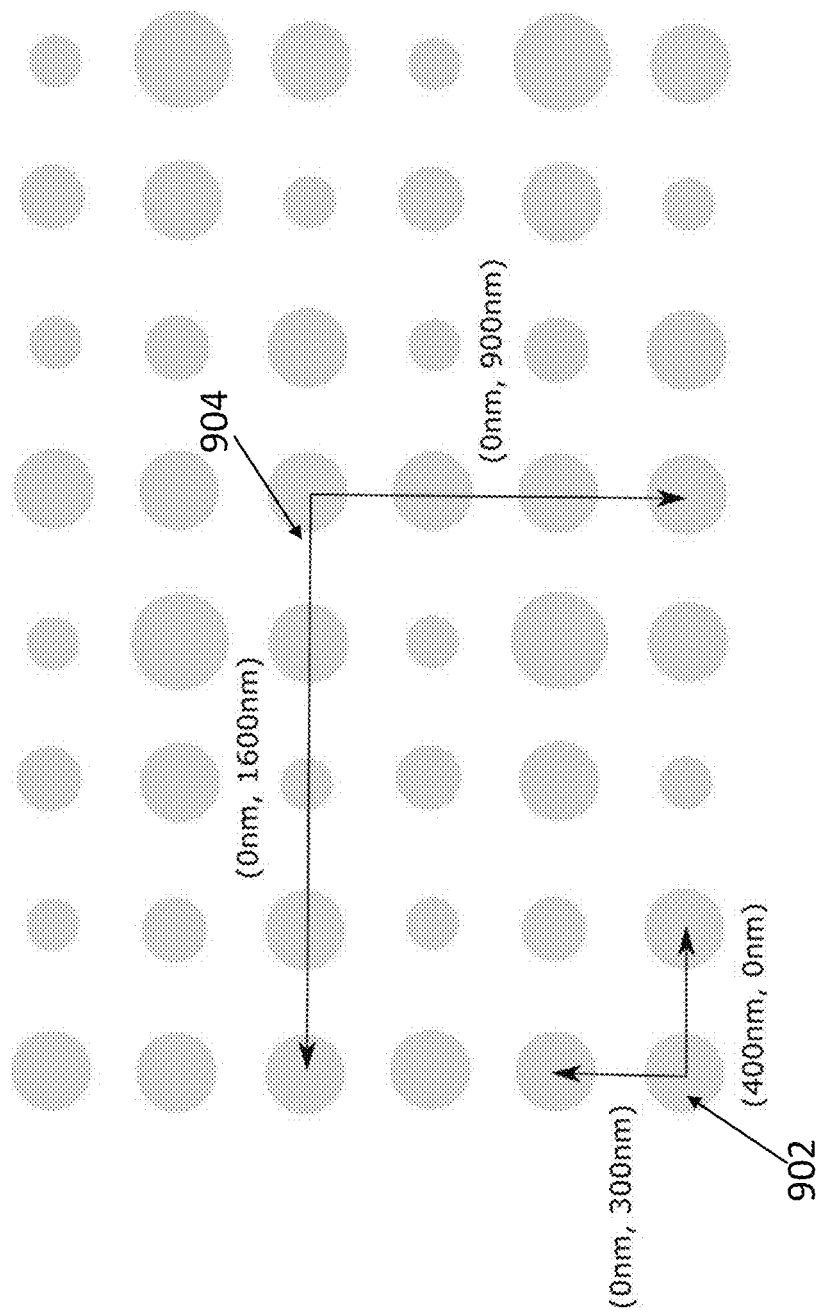
FIG. 9 illustrates a cross sectional view of a metasurface including metasurface pillars with a rectangular configuration.

In a rectangular case, a unit cell lattice may be (400 nm, 0 nm) and (0 nm, 300 nm) that maps to a supercell lattice of (1600 nm, 0 nm) and (0 nm, 900 nm) with the integer multiples (4, 0) and (0, 3), respectively. FIG. 9 illustrates a cross sectional view of a metasurface including metasurface pillars with a rectangular configuration. As illustrated, the unit cell lattice 902 may be (400 nm, 0 nm) and (0 nm, 300 nm) and the supercell lattice 904 may be (1600 nm, 0 nm) and (0 nm, 900 nm). The integer multiples may be (4, 0) and (0, 3), respectively.

Figure 10:
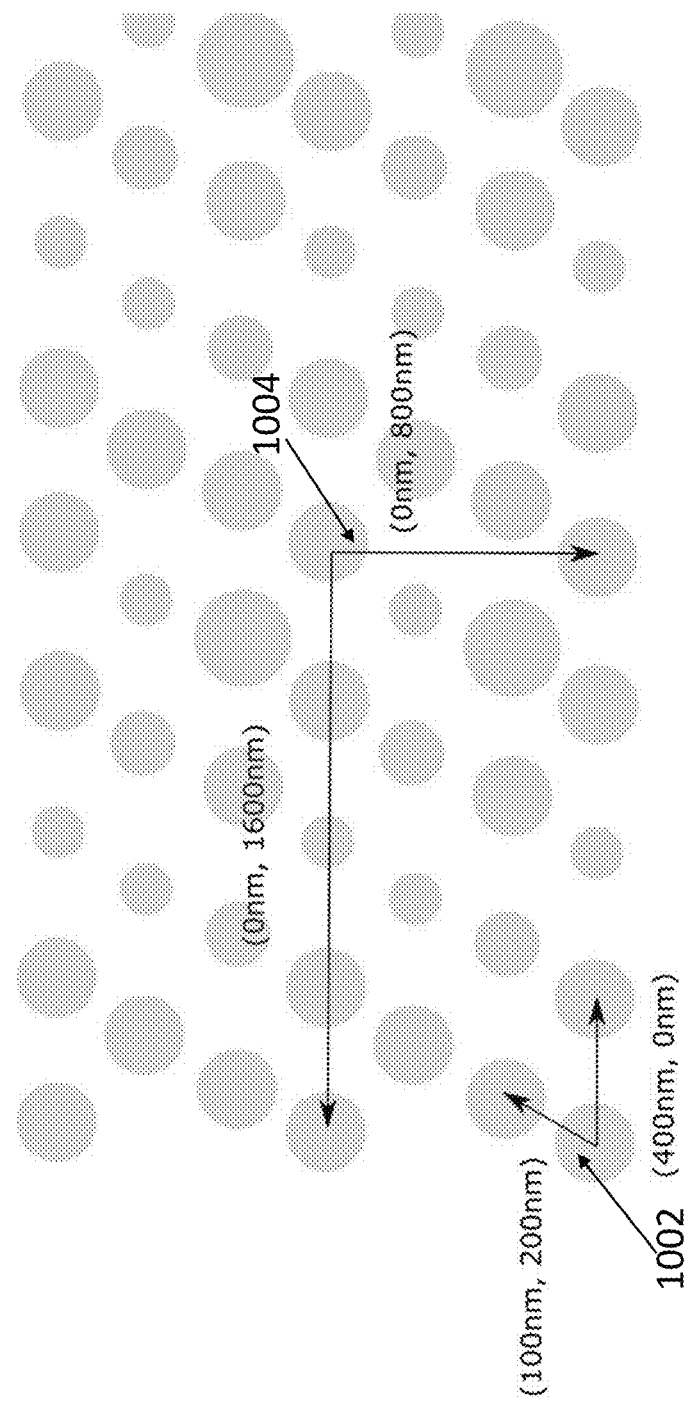
FIG. 10 illustrates a cross sectional view of a metasurface including metasurface pillars with a skew configuration.

In a skew case, the unit cell may be (400 nm, 0 nm) and (100 nm, 200 nm) that maps to a supercell lattice of (1600 nm, 0 nm) and (0 nm, 800 nm) with integer multiples of (4, 0) and (−1, 4), respectively. FIG. 10 illustrates a cross sectional view of a metasurface including metasurface pillars with a skew configuration. As illustrated, the unit cell lattice 1002 may be (400 nm, 0 nm) and (100 nm, 200 nm) and the supercell lattice 1004 may be (1600 nm, 0 nm) and (0 nm, 800 nm). The integer multiples may be (4, 0) and (−1, 4), respectively.

Figure 11:
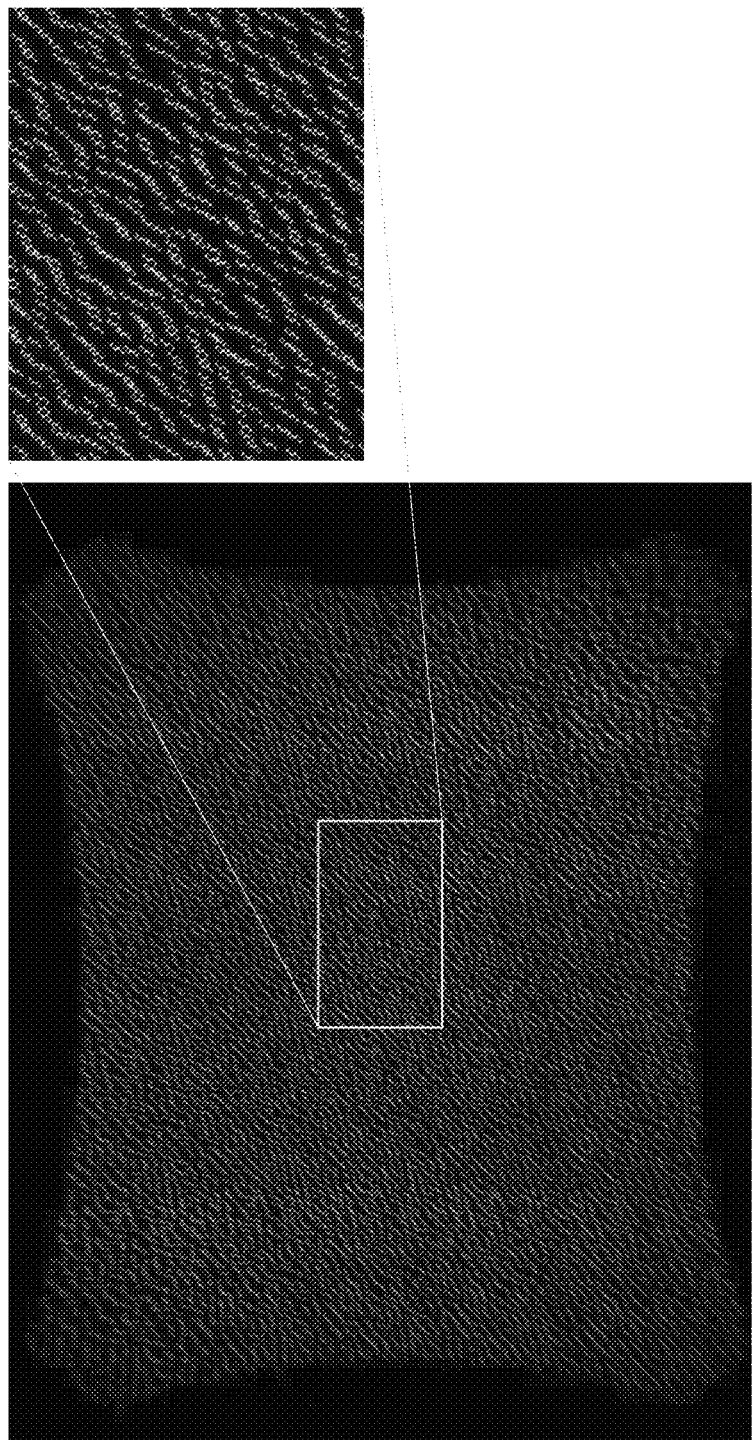
FIG. 11 provides a measurement of a dot pattern formed by the single meta-optic dot pattern projector according to embodiments.

FIG. 11 illustrates an example measurement of a dot pattern formed by the single meta-optic dot pattern projector described here according to embodiments. The inset image shows a zoomed view of the central region of the projected dot pattern. Such a dot projector may have 40,000 to 50,000 individual dots projected from a VCSEL array with significantly fewer apertures. The dot pattern in this case is a random array of dots projected as is typically used in a structured light application.

Figure 12:
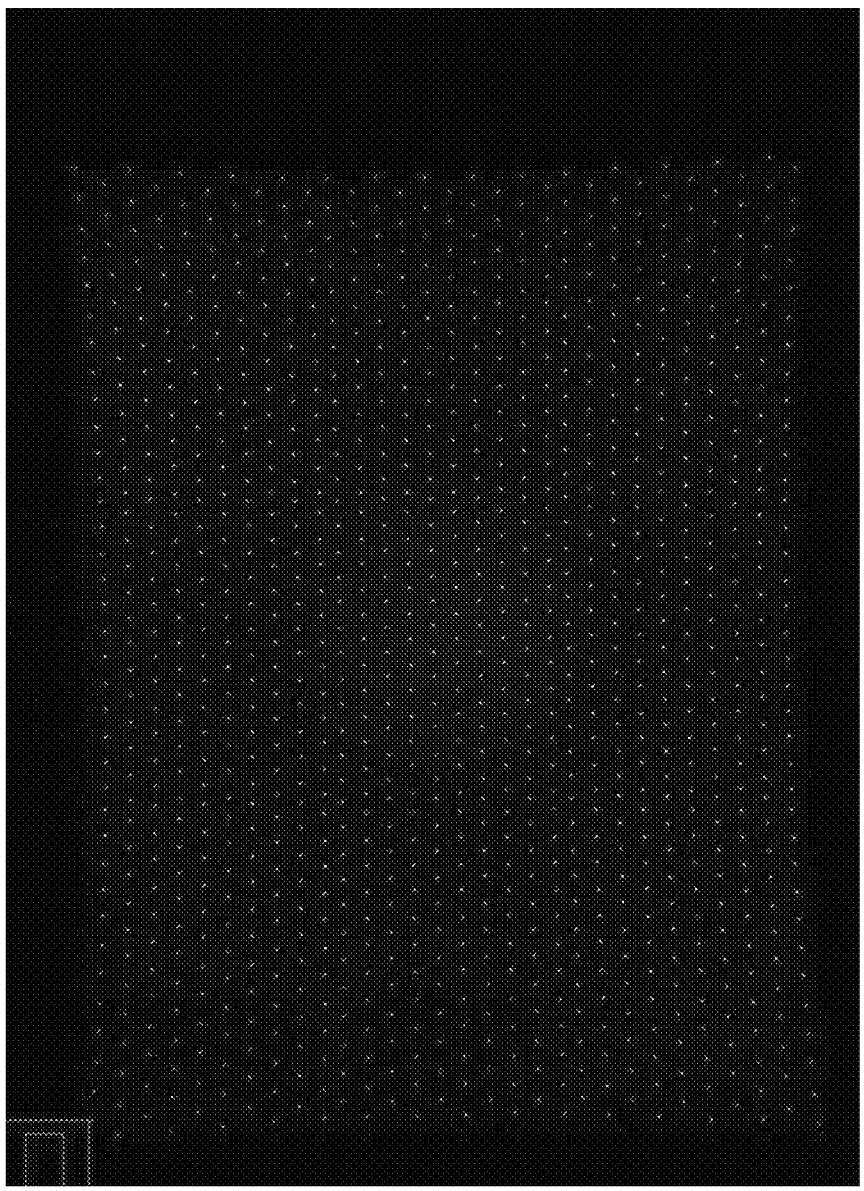
FIG. 12 provides a dot pattern formed by a single meta-optic according to embodiments.

FIG. 12 illustrate an example dot pattern formed by the single meta-optic dot pattern projector described here according to embodiments. The dot pattern here is a regular array of dots with approximately 1000 unique dots projected from a VCSEL array with significantly fewer dots. Such a dot pattern may be used in various applications such as a time of flight camera.

Figure 13A:
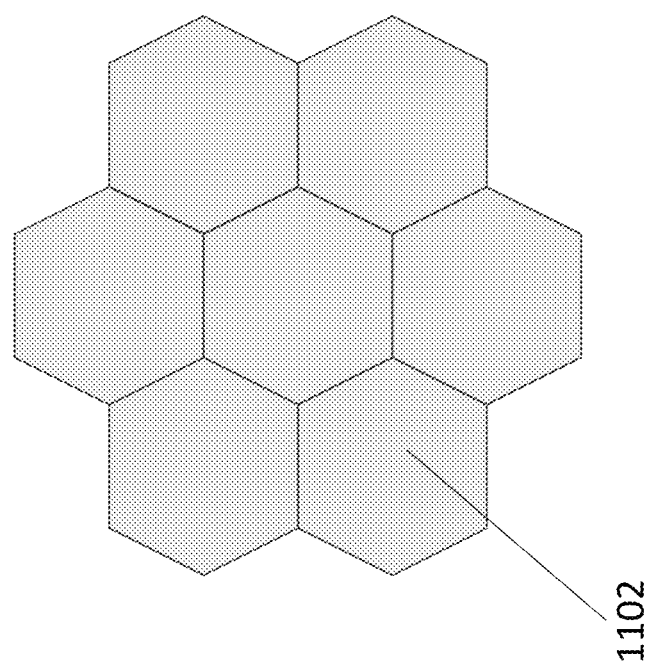
FIG. 13A provides an example of a tiling pattern for a metasurface chip according to embodiments.

FIG. 13A provides an example of a tiling pattern for a metasurface chip according to embodiments. As illustrated, the metasurface chip may include a hexagonal tiling pattern 1102. Instead of a rectangular tiling, the diffraction orders may be tiled in a hexagonal array. If the VCSEL chip also has a hexagonal boundary, then in the far field the dots may be tiled. A standard dot projector may project light that becomes significantly distorted at the edge of the field of view. The light at the corners generally is not imaged onto the image sensor and is thus wasted. From the meta-optic dot pattern projector, the projected pattern can be shared such that a larger fraction of the projected light will fall onto the image sensor.

Figure 13C:
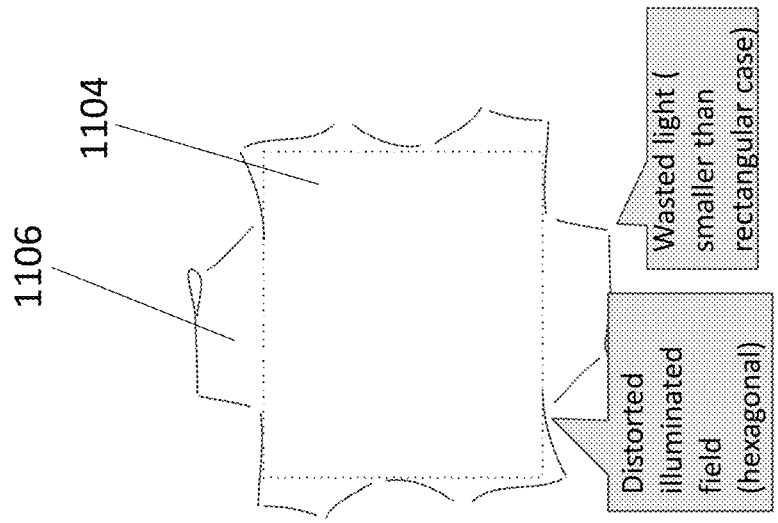
FIG. 13C illustrates an example output from a metasurface chip with a hexagonal tiling pattern.
Figure 13B:
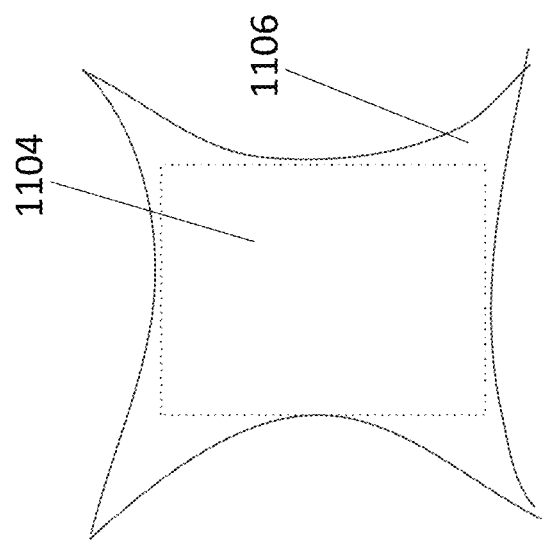
FIG. 13B illustrates an example output from a metasurface chip with a rectangular tiling pattern.

FIG. 13B illustrates an example output from a metasurface chip with a rectangular tiling pattern. The output may include pincushion distortion. The output may be imaged by an image sensor 1104. As illustrated, there may be wasted light 1106 that goes beyond the image sensor 1104. FIG. 13C illustrates an example output from a metasurface chip with a hexagonal tiling pattern. An example hexagonal tiling pattern is illustrated in FIG. 13A. The output may include pincushion distortion. The output may be imaged by an image sensor 1104. As illustrated, there may be wasted light 1106 that goes beyond the image sensor 1104. However, the wasted light 1106 may be smaller than for a metasurface chip with a rectangular tiling pattern illustrated in FIG. 13B. With a judicious choice of tiling and design, the wasted light 1106 may be minimized. This may not be possible with typical dot projectors which have lenses of fixed sizes.

Figure 14:
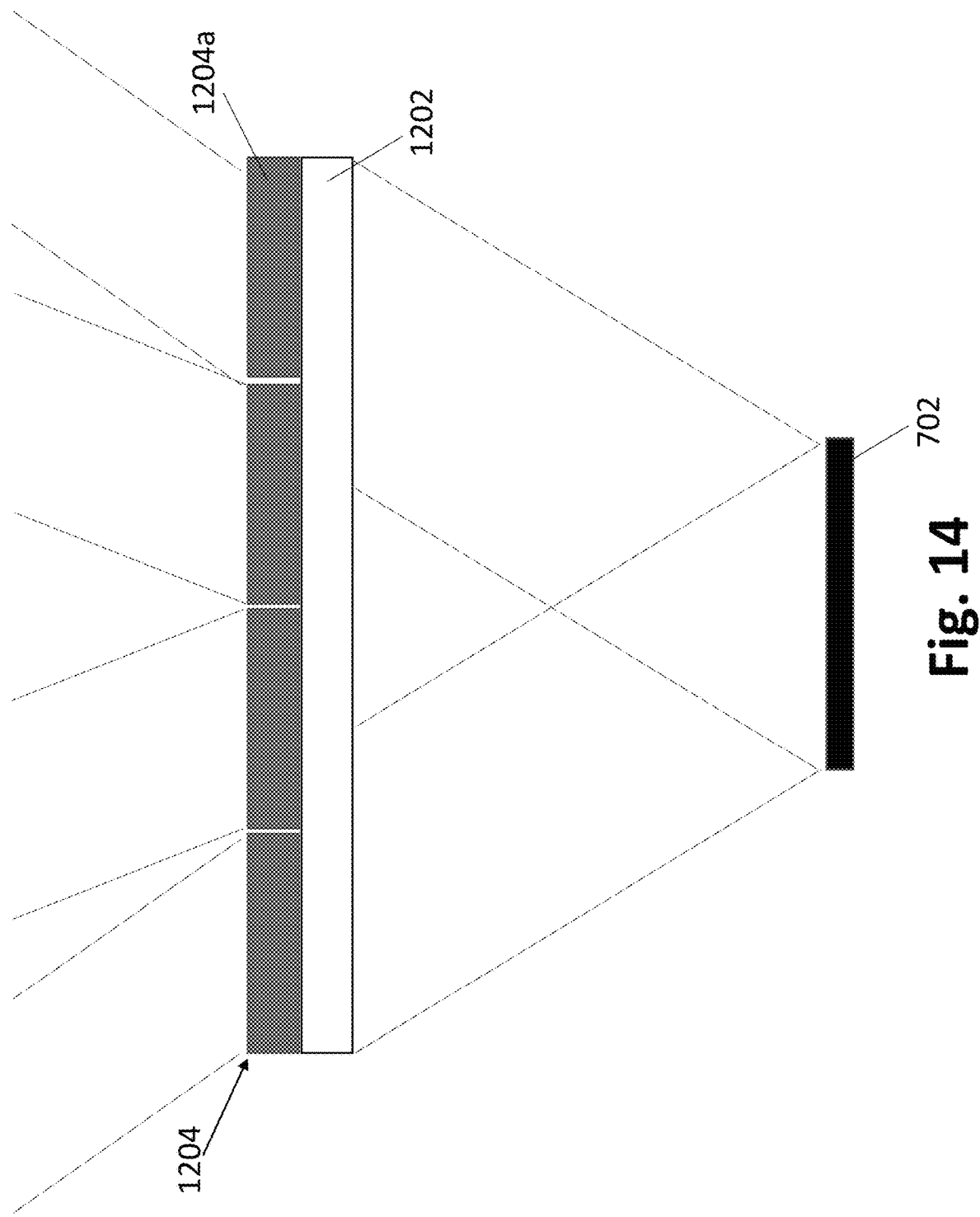
FIG. 14 provides a schematic drawing of a segmented meta-optic dot pattern projector according to embodiments.

FIG. 14 provides a schematic drawing of a segmented meta-optic dot pattern projector according to embodiments. As illustrated, a VCSEL array may output light towards a meta-optic including a substrate 1202 and meta-optic microlens array 1204. In such a case, the VCSEL light is incident on the meta-optic microlens array 1204. However, in this example the meta-optic microlens array 1204 may be segmented with subsegments 1204a. Each subsegment can be uniquely-designed to impart a specific function to the outgoing wavefront. For example, each subsegment 1204a may include an additional phase gradient which can be placed on the outgoing light. Such an implementation can lead to substantially thinner modules.

DOCTRINE OF EQUIVALENTS

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A single element dot pattern projector comprising:
a laser light source; and
a metasurface chip integrated onto the laser light source, wherein the metasurface chip includes metasurface elements spaced apart from the laser light source by a distance equal to a back focal length of the metasurface chip, and wherein the laser light source produces light which is diffracted through the metasurface elements to produce a dot pattern;
wherein the metasurface chip has dimensions that satisfy the following equations:

$$MSx = VCSELx + 2*A + B; \text{ and } A = C*\tan\left(\frac{\theta}{2}\right),$$

wherein B is the alignment tolerance of the metasurface chip, and θ is the full angle where the laser light source power falls to less than 0.5% of the total power, and wherein MSx is the width of the active area of the metasurface chip in the x direction, VCSELx is the width of the laser light source in the x direction, A is the estimated size of the laser light source beam beyond the VCSELx in the x direction, and C is a gap size between the laser light source and the metasurface chip which is equal to the back focal length of the metasurface chip.

2. The projector of claim 1, wherein the laser light source comprises a vertical cavity surface emitting laser (VCSEL).

3. The projector of claim 2, wherein the VCSEL comprises multiple individual laser apertures.

4. The projector of claim 3, wherein the individual laser apertures are configured to output dots having less than 0.5 degrees full width half maximum (FWHM).

5. The projector of claim 1, wherein the metasurface chip has a chip width in the x direction of MSx+2*Border, wherein Border is the size of the chip beyond the estimated size of the light source beam in the x direction.

6. The projector of claim 1, wherein the metasurface chip is integrated above the laser light source such that the laser light source outputs light through a gap between the metasurface elements and the laser light source.

7. The projector of claim 6, wherein the metasurface chip is integrated above the backside of the laser light source such that light is outputted through the backside of the laser light source onto the metasurface chip.

8. The projector of claim 6, wherein the metasurface chip is integrated above the frontside of the laser light source such that light is outputted through the frontside of the laser light source onto the metasurface chip.

9. The projector of claim 6, wherein the gap is provided by a substrate of the metasurface chip.

10. The projector of claim 6, wherein the gap is provided by an epoxy or air between the laser light source and the metasurface elements.

11. The projector of claim 1, wherein the metasurface elements are positioned at the top of a substrate of the metasurface chip.

12. The projector of claim 1, wherein the metasurface chip provides both a lens function and a multiplication function to the light from the laser light source.

13. The projector of claim 12, wherein the metasurface chip further provides a linear phase function to the light from the laser light source.

14. The projector of claim 1, wherein the dot pattern has an asymmetric pattern.

15. The projector of claim 1, wherein the laser light source is integrated into a chip and the laser light source chip and the metasurface chip are integrated into a single monolithic module.

16. The projector of claim 1, wherein the metasurface elements are organized into multiple hexagonally shaped tiles.

17. A method of forming a dot pattern with a laser light source, the method comprising:
providing the laser light source integrated into a chip;
providing a metasurface chip including metasurface elements;
integrating the laser light source chip with the metasurface chip such that the metasurface elements are spaced apart from the laser light source by a distance equal to a back focal length of the metasurface chip; and
producing light from the laser light source which is diffracted through the metasurface elements to produce the dot pattern;
wherein the metasurface chip has dimensions that satisfy the following equations:

$$MSx = VCSELx + 2*A + B; \text{ and } A = C*\tan\left(\frac{\theta}{2}\right),$$

wherein B is the alignment tolerance of the metasurface chip, and θ is the full angle where the laser light source power falls to less than 0.5% of the total power, and wherein MSx is the width of the active area of the metasurface chip in the x direction, VCSELx is the width of the laser light source in the x direction, A is the estimated size of the laser light source beam beyond the VCSELx in the x direction, and C is a gap size between the laser light source and the metasurface chip which is equal to the back focal length of the metasurface chip.

18. The method of claim 17, wherein the laser light source comprises a vertical cavity surface emitting laser (VCSEL).

19. The method of claim 17, wherein the metasurface chip has a chip width in the x direction of MSx+2*Border, wherein Border is the size of the chip beyond the estimated size of the light source beam in the x direction.

* * * * *